(12) United States Patent
Kimura

(10) Patent No.: US 7,026,426 B2
(45) Date of Patent: Apr. 11, 2006

(54) ROOM TEMPERATURE CURABLE ORGANOPOLYSILOXANE COMPOSITIONS

(75) Inventor: Tsuneo Kimura, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 155 days.

(21) Appl. No.: 10/694,186

(22) Filed: Oct. 28, 2003

(65) Prior Publication Data

US 2004/0092694 A1    May 13, 2004

Related U.S. Application Data

(62) Division of application No. 09/974,843, filed on Oct. 12, 2001, now abandoned.

(30) Foreign Application Priority Data

Oct. 12, 2000   (JP)   ............................. 2000-312022

(51) Int. Cl.
   *C08G 77/26*   (2006.01)
   *C08L 83/08*   (2006.01)

(52) U.S. Cl. ........................... 528/38; 528/12; 528/17; 528/34; 528/901; 524/588; 524/864; 524/869

(58) Field of Classification Search .................. 528/12, 528/17, 34, 38, 901; 524/588, 864, 869
   See application file for complete search history.

(56) References Cited

U.S. PATENT DOCUMENTS

| | | | |
|---|---|---|---|
| 3,627,800 A | 12/1971 | Owen et al. | |
| 4,629,775 A | 12/1986 | Arai et al. | |
| 4,721,765 A | 1/1988 | Inoue et al. | |
| 5,231,207 A | 7/1993 | Yanagisawa et al. | |
| 5,286,766 A | 2/1994 | Arai et al. | |
| 5,300,611 A | 4/1994 | Fujioka et al. | |
| 5,717,009 A | 2/1998 | Matsushita et al. | |
| 5,733,995 A | 3/1998 | Kimura et al. | |
| 6,573,356 B1* | 6/2003 | Araki et al. | ................ 528/34 |
| 6,833,407 B1* | 12/2004 | Ahmed et al. | ............. 524/588 |

FOREIGN PATENT DOCUMENTS

| | | |
|---|---|---|
| EP | 0 537 744 A1 | 4/1993 |
| JP | 61-64753 A | 4/1986 |
| JP | 61-65891 A | 4/1986 |

* cited by examiner

*Primary Examiner*—Jeffrey B. Robertson
(74) *Attorney, Agent, or Firm*—Birch, Stewart, Kolasch & Birch, LLP

(57) ABSTRACT

A room temperature curable organopolysiloxane composition comprising (A) an organopolysiloxane of $HO(SiR^1_2O)_nH$ and/or $(R^2O)_{3-m}R^1_mSiO(SiOR^1_2O)_nSiR^1_m(OR^2)_{3-m}$ wherein $R^1$ is a monovalent C1–10 hydrocarbon radical, $R^2$ is a monovalent C1–6 hydrocarbon radical, n is an integer of at least 10, and m is 0 or 1, (B) a silane compound having at least two hydrolyzable radicals, the remaining radicals being methyl, ethyl, propyl, vinyl or phenyl, and/or a partial hydrolyzate thereof, and (C) an organosilicon compound of $(RO)_pR^1_{3-p}SiR^3$—NH—$R^4$—$NH_2$ wherein $R^1$ and $R^2$ are as defined above, $R^3$ is a divalent C1–10 hydrocarbon radical, $R^4$ is a divalent aromatic ring-bearing C7–10 hydrocarbon radical, and p is 1, 2 or 3, at least one of the NH and $NH_2$ radicals being not directly attached to the aromatic ring in $R^4$, cures into silicone rubber which has improved adherence even upon exposure to hot steam.

10 Claims, No Drawings

ROOM TEMPERATURE CURABLE ORGANOPOLYSILOXANE COMPOSITIONS

This application is a division of application Ser. No. 09/974,843, filed Oct. 12, 2001, now abandoned. The entire contents of application Ser. No. 09/974,843, are hereby expressly incorporated by reference.

FIELD OF THE INVENTION

This invention relates to room temperature curable organopolysiloxane compositions capable of maintaining improved adhesion upon exposure to hot steam and useful in bonding and securing of architectural parts and electrical and electronic parts.

BACKGROUND OF THE INVENTION

Because of their ease of handling, heat resistance, adherence and good electrical properties, room temperature vulcanizable (RTV) silicone rubber compositions which crosslink with moisture are used in a wide variety of applications including building sealants and adhesives for electrical and electronic parts. In the applications of electrical and electronic parts, especially sealing of microwave oven window frames, silicone rubber which crosslinks with moisture is often employed due to heat resistance and adherence. In the window frame sealing application, the silicone rubber as cured is required to have initial adherence and heat resistant adherence to the adherends, glass and coated steel plate and to maintain adherence even upon exposure to hot steam. To impart tack to RTV silicone rubber, the addition of silane coupling agents in the form of silicon compounds is effective. However, RTV silicone rubber compositions containing various conventional silane coupling agents such as minopropyltriethoxysilane are good in initial adherence and heat resistant adherence, but fail to improve adherence upon exposure to hot steam.

For example, U.S. Pat. No. 4,629,775 and JP-A 61-64753 disclose RTV silicone rubber compositions comprising as adhesive aids the reaction product of a mercaptosilane with an isocyanate or polyisocyanate compound. They are good in initial adherence, but insufficient in adherence upon exposure to hot steam.

SUMMARY OF THE INVENTION

An object of the invention is to provide a room temperature curable organopolysiloxane composition which can maintain adherence to glass even upon exposure to hot steam.

The inventor has discovered that blending a specific silane compound of the general formula (3) below in a room temperature curable organopolysiloxane composition dramatically improves the adherence of the composition to glass upon exposure to hot steam, which was conventionally thought difficult to maintain.

The present invention provides a room temperature curable organopolysiloxane composition comprising (A) 100 parts by weight of an organopolysiloxane of the following general formula (1):

$$HO(SiR^1_2O)_nH \quad (1)$$

wherein $R^1$ is a substituted or unsubstituted monovalent hydrocarbon radical of 1 to 10 carbon atoms, and n is an integer of at least 10, and/or an organopolysiloxane of the following general formula (2):

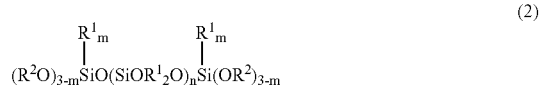

wherein $R^1$ and n are as defined above, $R^2$ is a substituted or unsubstituted monovalent hydrocarbon radical of 1 to 6 carbon atoms, and m is independently an integer of 0 or 1, (B) 0.1 to 30 parts by weight of a silane compound having at least two hydrolyzable radicals each attached to a silicon atom in a molecule, the remaining radicals attached to silicon atoms being selected from among methyl, ethyl, propyl, vinyl and phenyl, and/or a partial hydrolyzate thereof, and (C) 0.1 to 10 parts by weight of an organosilicon compound of the following general formula (3):

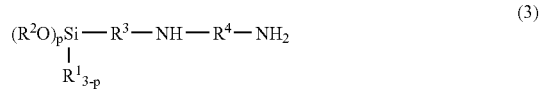

wherein $R^1$ and $R^2$ are as defined above, $R^3$ is a divalent hydrocarbon radical of 1 to 10 carbon atoms, $R^4$ is a divalent aromatic ring-bearing hydrocarbon radical of 7 to 10 carbon atoms, and p is an integer of 1 to 3, at least one of the NH and $NH_2$ radicals being not directly attached to the aromatic ring in $R^4$.

DESCRIPTION OF THE PREFERRED EMBODIMENT

Component (A)

In the organopolysiloxane composition of the invention, component (A) is an organopolysiloxane of the general formula (1) and/or (2).

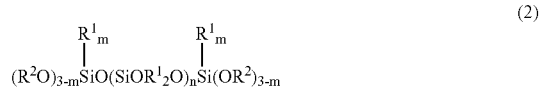

$R^1$ stands for a substituted or unsubstituted monovalent hydrocarbon radical of 1 to 10 carbon atoms, for example, alkyl radicals such as methyl, ethyl and propyl, cycloalkyl radicals such as cyclohexyl, alkenyl radicals such as vinyl and allyl, aryl radicals such as phenyl and tolyl, and substituted ones of the foregoing radicals in which some of the hydrogen atoms attached to carbon atoms are replaced by halogen atoms or the like, such as 3,3,3-trifluoropropyl. Of these, methyl is preferred. The plural $R^1$ radicals in formulae (1) and (2) may be the same or different. The letter n is an integer of at least 10, preferably such an integer that the diorganopolysiloxane may have a viscosity of about 25 to 500,000 centistokes at 25° C., especially about 500 to 100,000 centistokes at 25° C.

$R^2$ stands for a substituted or unsubstituted monovalent hydrocarbon radical of 1 to 6 carbon atoms, for example, alkyl radicals such as methyl, ethyl and propyl, cycloalkyl radicals such as cyclohexyl, alkenyl radicals such as vinyl, allyl and propenyl, and phenyl. Of these, methyl is preferred. The letter m is 0 or 1 independently on the right or left side.

Component (B)

Component (B) is a silane compound having on the average at least two hydrolyzable radicals each attached to a silicon atom in a molecule, the remaining radicals attached to silicon atoms being selected from among methyl, ethyl, propyl, vinyl and phenyl, and/or a partial hydrolyzate thereof.

The silane compound generally has the formula:

$$R^5{}_{4-a}SiX_a$$

wherein $R^5$ is a radical selected from among methyl, ethyl, propyl, vinyl and phenyl, X is a hydrolyzable radical, and "a" is 2 or 3. The silane compound may be used alone or in admixture of two or more.

Examples of the hydrolyzable radicals in the silane compound or partial hydrolyzates thereof include ketoxime, alkoxy, acetoxy and isopropenoxy radicals, with the ketoxime, alkoxy and isopropenoxy radicals being especially preferred.

Illustrative examples of the silane compound (B) include ketoximesilanes such as methyltris(dimethyl ketoxime)silane, methyltris(methyl ethyl ketoxime)silane, ethyltris(methyl ethyl ketoxime)silane, methyltris(methyl isobutyl ketoxime)silane, vinyltris(methyl ethyl ketoxime)silane, and phenyltris(methyl ethyl ketoxime)silane; as well as alkoxysilanes such as methyltrimethoxysilane, dimethyldimethoxysilane, vinyltrimethoxysilane, phenyltrimethoxysilane and methyltriethoxysilane; isopropenoxy radical-containing silanes such as methyltriisopropenoxysilane, ethyltriisopropenoxysilane and vinyltriisopropenoxysilane; and acetoxysilanes such as methyltriacetoxysilane, ethyltriacetoxysilane, and vinyltriacetoxysilane. Partial hydrolytic condensates of the foregoing silanes are also included.

An appropriate amount of the silane compound or partial hydrolyzate thereof (B) used is 0.1 to 30 parts by weight, preferably 0.5 to 20 parts by weight, and more preferably 1 to 15 parts by weight per 100 parts by weight of the organopolysiloxane (A). Less than 0.1 part of component (B) induces insufficient crosslinking, failing to give a cured rubber having desired elasticity. More than 30 parts of component (B) tends to adversely affect mechanical properties of cured compositions.

Component (C)

The organosilicon compound (C) has a critical function of enhancing the adherence of the composition upon exposure to steam.

The organosilicon compound (C) should have an imino (NH) radical and an amino ($NH_2$) radical, and an aromatic ring between the NH and $NH_2$ radicals, such that at least one of the NH and $NH_2$ radicals is not directly attached to the aromatic ring. This compound is described in detail in U.S. Pat. No. 5,231,207. Specifically, the organosilicon compound has the following general formula (3).

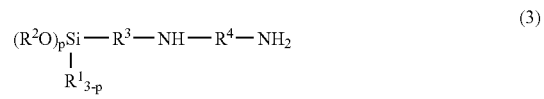
(3)

Herein $R^1$ and $R^2$ are as defined above, $R^3$ is a divalent hydrocarbon radical of 1 to 10 carbon atoms, $R^4$ is a divalent aromatic ring-bearing hydrocarbon radical of 7 to 10 carbon atoms, and p is an integer of 1 to 3, at least one of the NH and $NH_2$ radicals being not directly attached to the aromatic ring in $R^4$.

In formula (3), $R^2$ is preferably methyl or ethyl. Examples of the divalent hydrocarbon radical represented by $R^3$ include alkylene radicals such as methylene, ethylene, propylene, tetramethylene, hexamethylene, octamethylene, decamethylene, and 2-methylpropylene, arylene radicals such as phenylene, and combinations of alkylene and arylene radicals. Preferably $R^3$ is methylene, ethylene or propylene, with the propylene being most preferred. $R^4$ is preferably a combination of phenylene with alkylene. Preferred combinations for $R^4$ include the following structures (4) to (12).

 (4)

 (5)

 (6)

 (7)

 (8)

 (9)

 (10)

 (11)

—$CH_2$—$CH_2$—$CH_2$—$C_6H_4$—$CH_2$— (12)

Of these, formula (5) is especially preferred.

The alkylene portion attached to the right side ($NH_2$ side in formula (3)) of the phenylene radical (or the —$NH_2$ radical in the absence of alkylene portion) may be at the ortho, meta- or para-position of phenylene.

Illustrative examples of the organosilicon compound of formula (3) are given below by formulae (13) through (123).

(13)

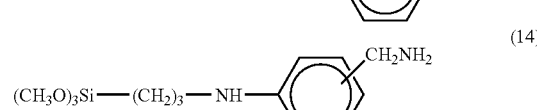
(14)

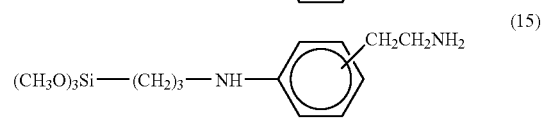
(15)

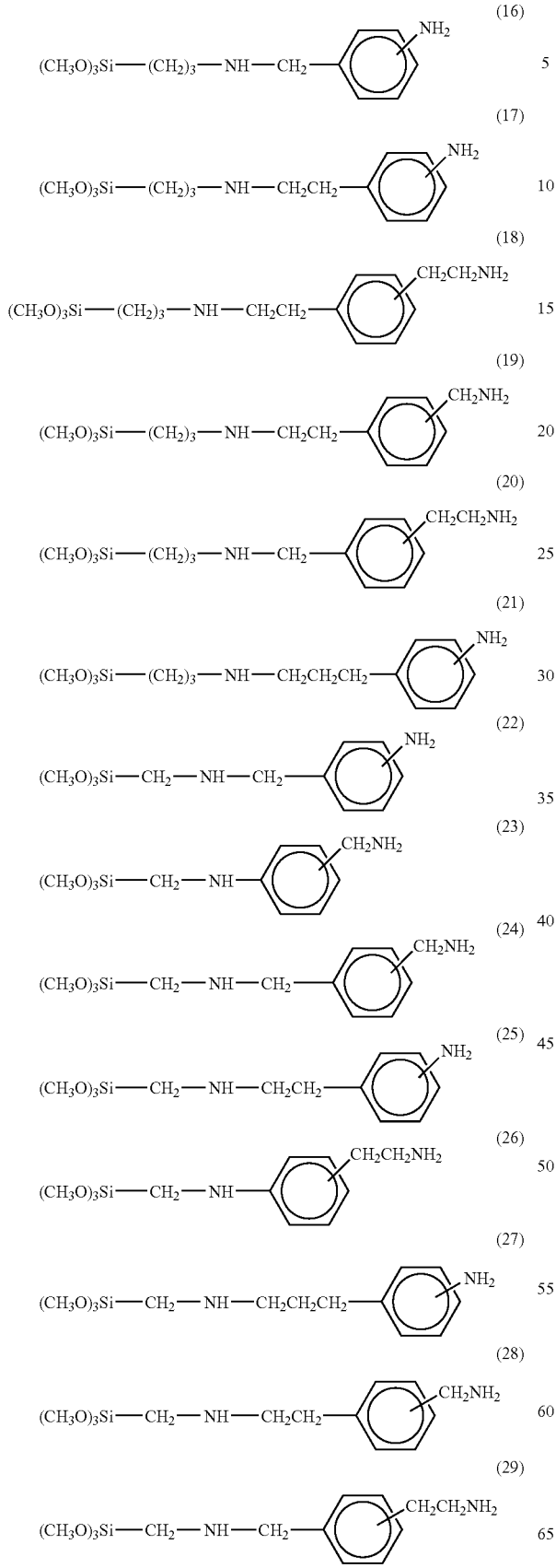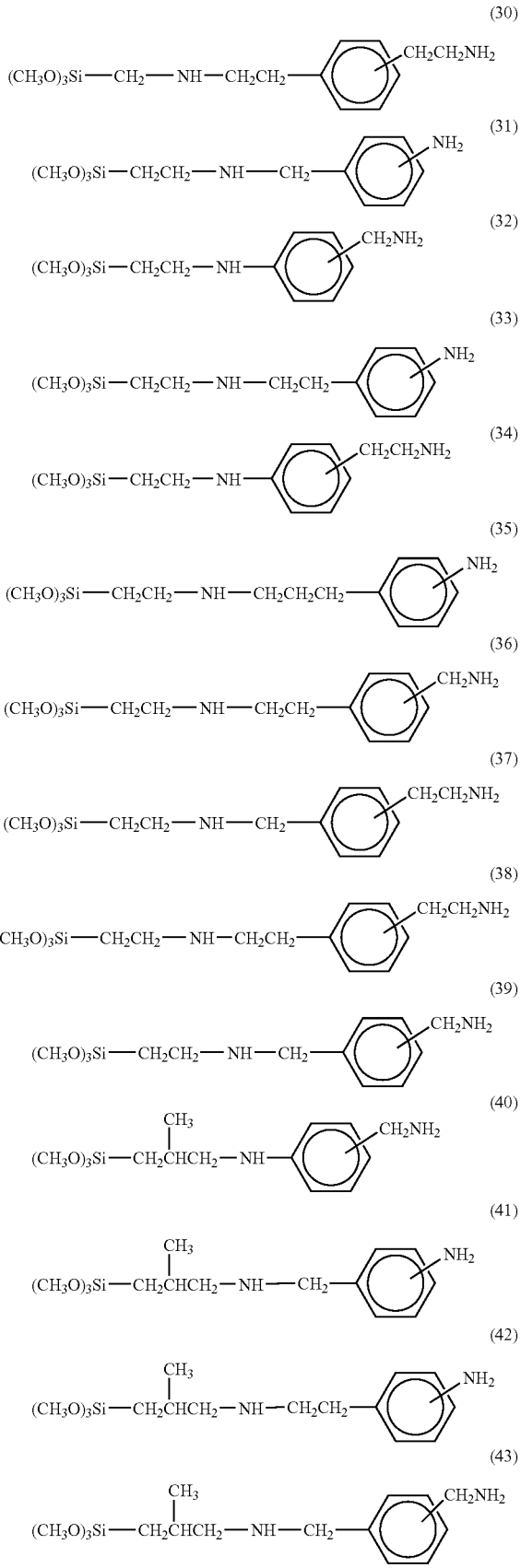

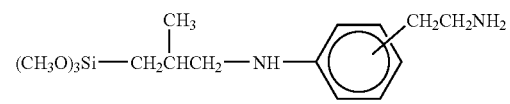
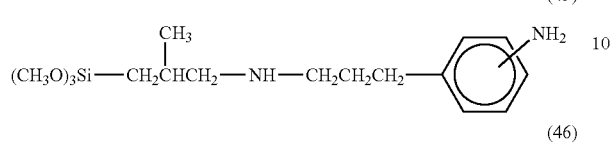
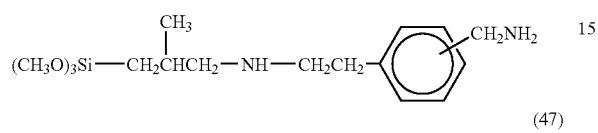
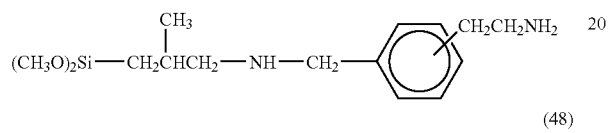
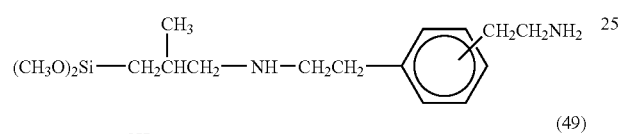
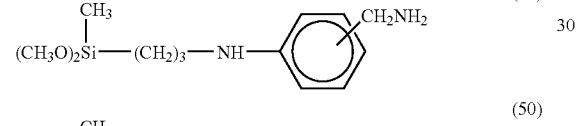
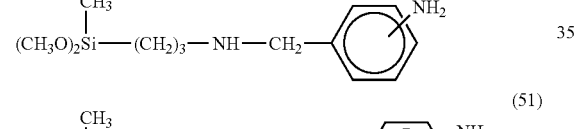
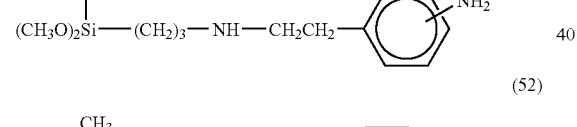
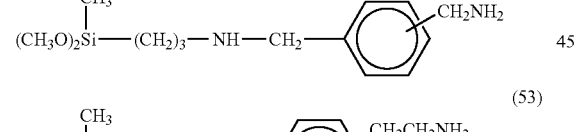
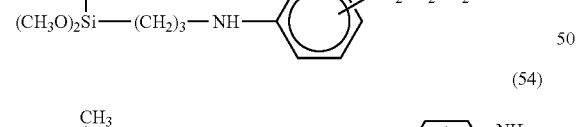
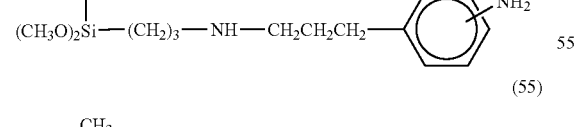
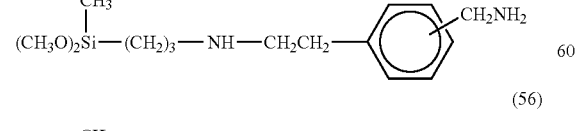
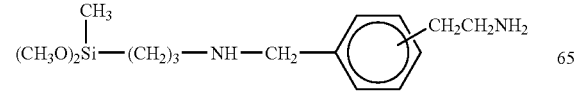
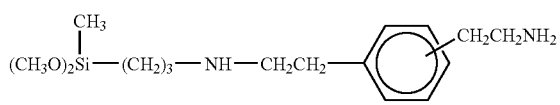
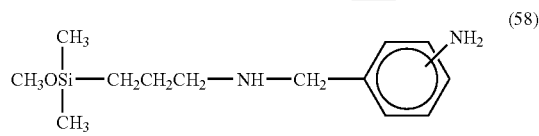
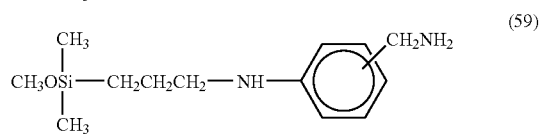
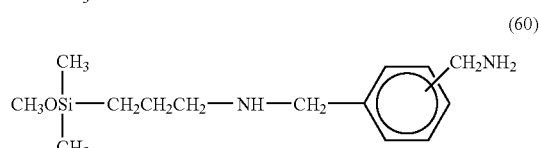
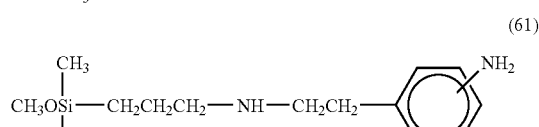
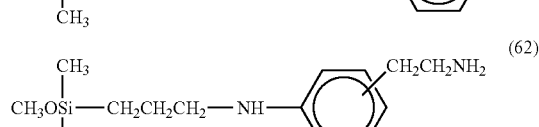
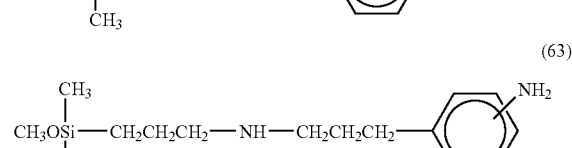
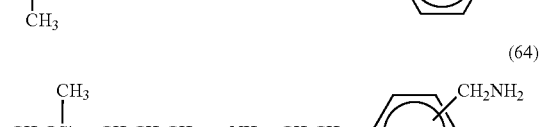
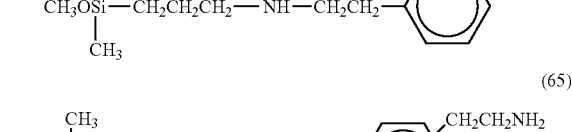
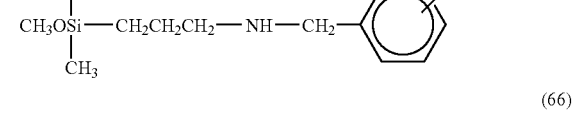
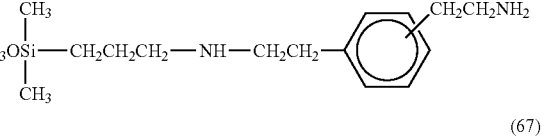
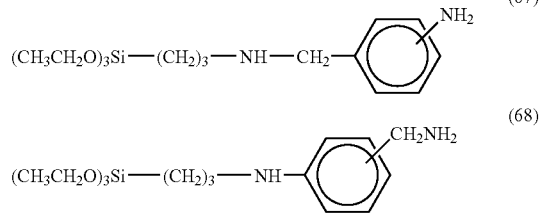

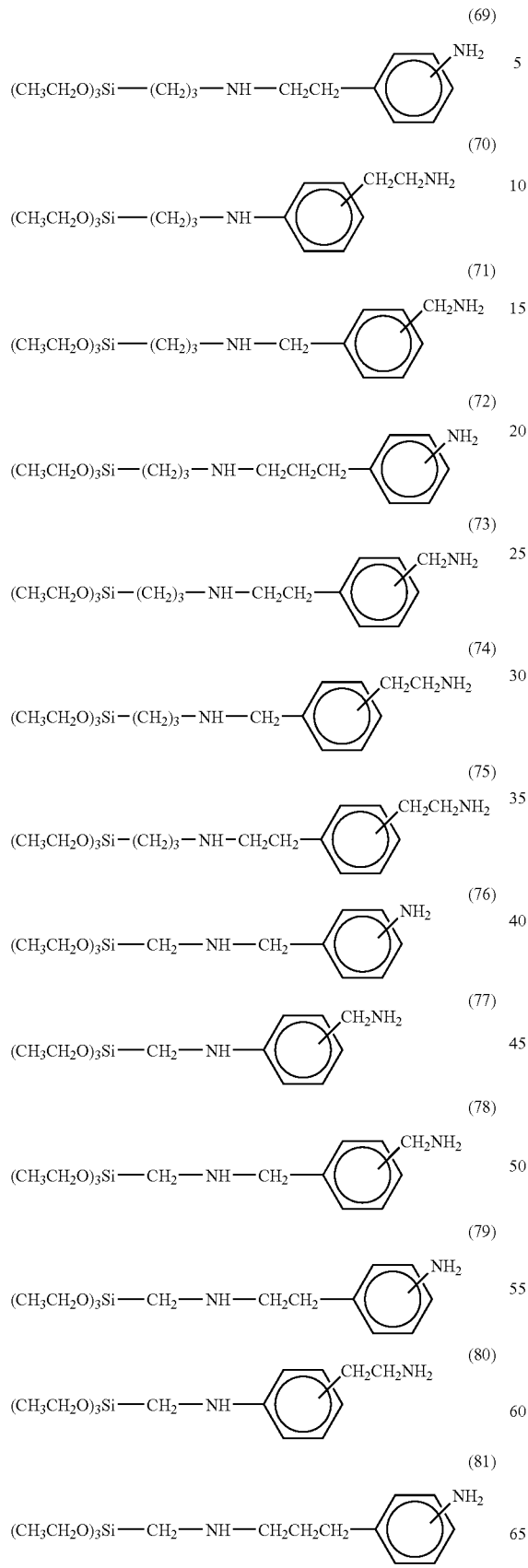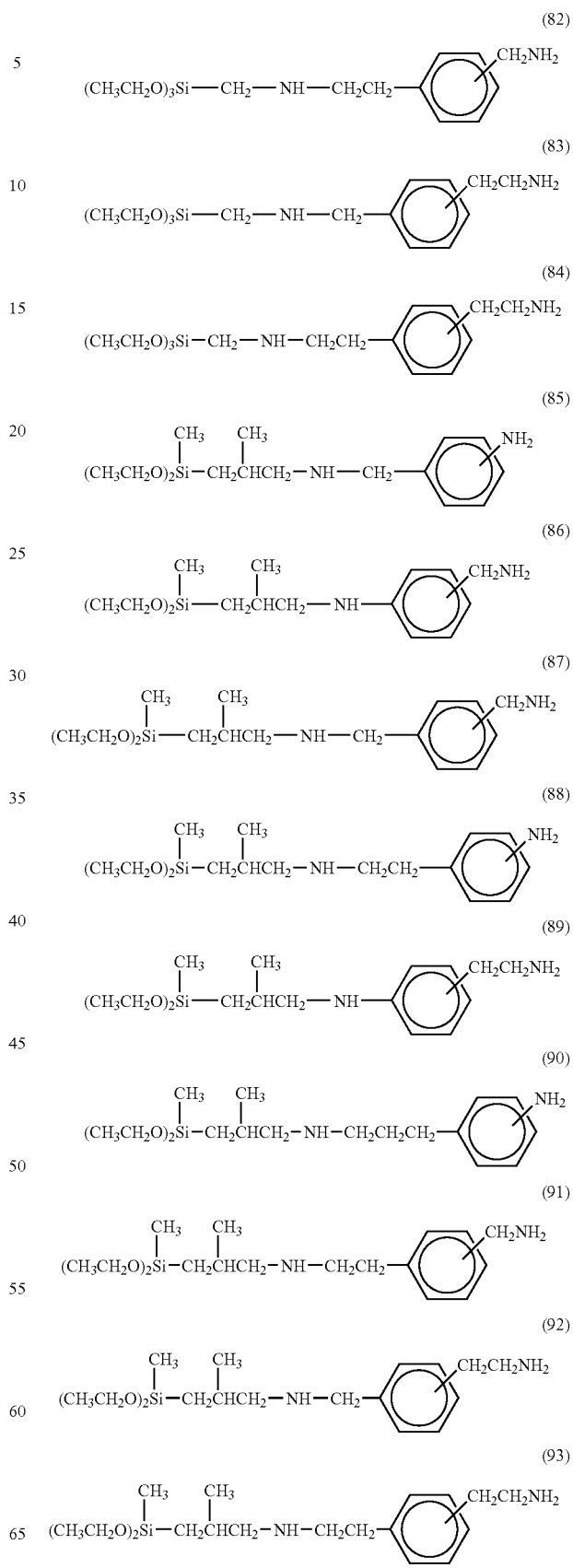

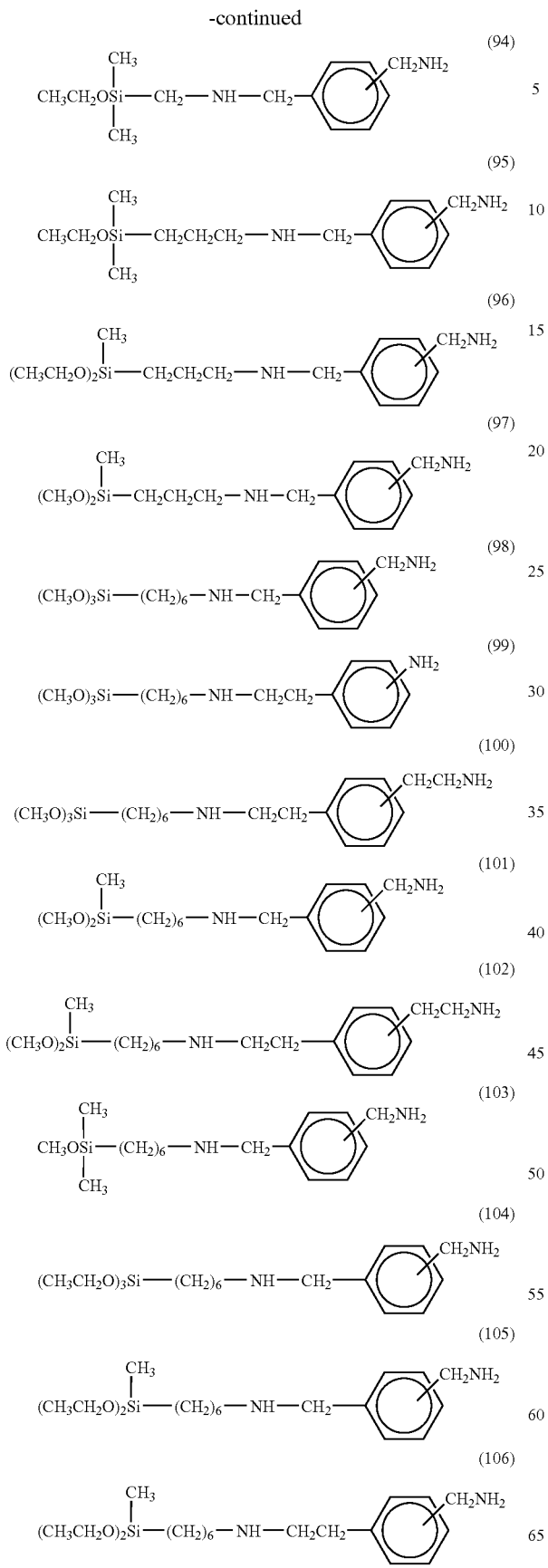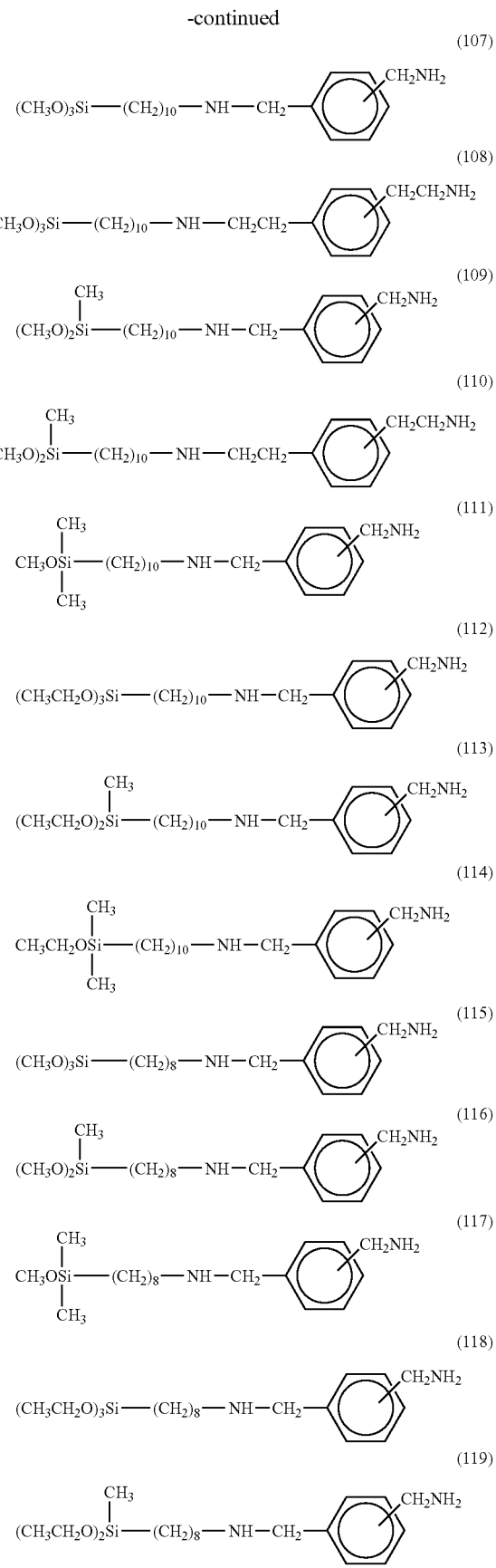

-continued

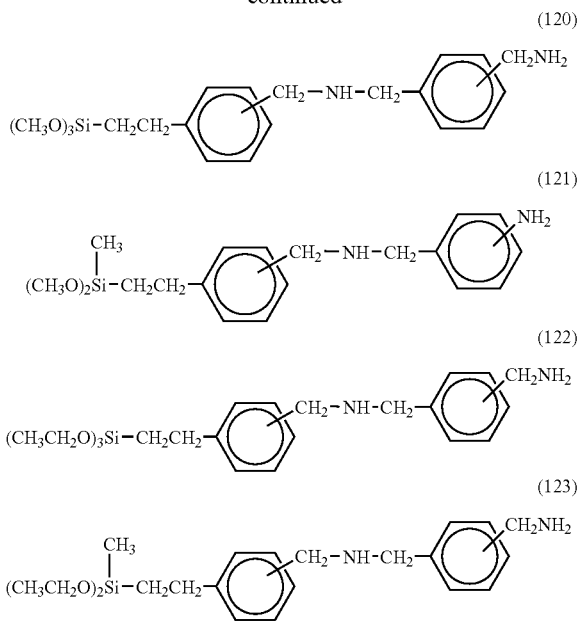

An appropriate amount of the organosilicon compound (C) used is 0.1 to 10 parts, and preferably 1 to 5 parts by weight per 100 parts by weight of the organopolysiloxane (A).

Other Components

In addition to the above-described components, well-known fillers and catalysts are used in the inventive composition if desired or preferred.

Exemplary fillers are silica including ground silica, fumed silica and wet silica, carbonaceous powders such as carbon black including acetylene black, calcium carbonate, zinc carbonate, basic zinc carbonate, zinc oxide and magnesium oxide. Among them, silica and carbon black are preferred. The silica is preferably surface treated. The fillers are blended in amounts of 0 to about 500 parts, preferably about 2 to 200 parts, and more preferably about 3 to 100 parts by weight per 100 parts by weight of the organopolysiloxane (A).

Useful catalysts include well-known condensation reaction catalysts such as organic tin ester compounds, organic tin chelate compounds, alkoxytitanium compounds, titanium chelate compounds, and guanidyl radical-bearing silicon compounds. The catalysts are used in catalytic amounts, usually up to about 10 parts, preferably 0.001 to 10 parts, and more preferably 0.01 to 5 parts by weight per 100 parts by weight of the organopolysiloxane (A).

To improve various other properties, if necessary, there may be blended additives, for example, polyethers for improving thixotropy, pigments, anti-mildew agents, and anti-fungus agents.

The composition of the invention may be prepared by mixing components (A) to (C) in a commonly used mixer such as a Shinagawa mixer, planetary mixer or flow jet mixer, preferably under anhydrous conditions.

EXAMPLE

Examples of the invention are given below by way of illustration and not by way of limitation. All parts are by weight.

Example 1

Composition 1 was prepared by mixing 90 parts of a trimethoxysilyl end-blocked polydimethylsiloxane having a viscosity of 900 centistokes at 25° C. with 10 parts of fumed silica surface treated with dimethyldichlorosilane in a mixer. Then 2 parts of vinyltrimethoxysilane and 0.1 part of dioctyltin dilaurate were added to the mixture, which was thoroughly mixed under vacuum. Further, 2.0 parts of a silane compound of the formula:

$(CH_3O)_3Si\text{—}C_3H_6\text{—}NH\text{—}CH_2\text{—}C_6H_4\text{—}CH_2\text{—}NH_2$ was added to the mixture, which was thoroughly mixed under vacuum.

Example 2

Composition 2 was prepared by mixing 90 parts of a silanol end-blocked polydimethylsiloxane having a viscosity of 700 centistokes at 25° C. with 10 parts of acetylene black in a mixer. Then 6 parts of methyltributanoximesilane and 0.1 part of dibutyltin dioctate were added to the mixture, which was thoroughly mixed under vacuum. Further, 2.0 parts of a silane compound of the formula:

$(CH_3O)_3Si\text{—}C_3H_6\text{—}NH\text{—}C_6H_4\text{—}CH_2\text{—}NH_2$ was added to the mixture, which was thoroughly mixed under vacuum.

Example 3

Composition 3 was prepared by mixing 90 parts of a silanol end-blocked polydimethylsiloxane having a viscosity of 700 centistokes at 25° C. with 10 parts of acetylene black in a mixer. Then 6 parts of vinyltriisopropenoxysilane and 0.5 part of tetramethylguanidylpropyltrimethoxysilane were added to the mixture, which was thoroughly mixed under vacuum. Further, 2.0 parts of a silane compound of the formula:

$(CH_3O)_3Si\text{—}C_3H_6\text{—}NH\text{—}CH_2\text{—}C_6H_4\text{—}C_2H_4\text{—}NH_2$ was added to the mixture, which was thoroughly mixed under vacuum.

Comparative Example 1

Composition 4 was prepared by mixing 90 parts of a silanol end-blocked polydimethylsiloxane having a viscosity of 700 centistokes at 25° C. with 10 parts of acetylene black in a mixer. Then 6 parts of vinyltriisopropenoxysilane and 0.5 part of tetramethylguanidylpropyltrimethoxysilane were added to the mixture, which was thoroughly mixed under vacuum. Further, 2.0 parts of a silane compound of the formula:

$(CH_3O)_3Si\text{—}C_3H_6\text{—}NH_2$ was added to the mixture, which was thoroughly mixed under vacuum.

Comparative Example 2

Composition 5 was prepared by mixing 90 parts of a silanol end-blocked polydimethylsiloxane having a viscosity of 700 centistokes at 25° C. with 10 parts of acetylene black in a mixer. Then 6 parts of vinyltriisopropenoxysilane and 0.5 part of tetramethylguanidylpropyltrimethoxysilane were added to the mixture, which was thoroughly mixed under vacuum. Further, 2.0 parts of a silane compound of the formula:

$(C_2H_5O)_3Si-C_3H_6-NH_2$ was added to the mixture, which was thoroughly mixed under vacuum.

Comparative Example 3

Composition 6 was prepared by mixing 90 parts of a silanol end-blocked polydimethylsiloxane having a viscosity of 700 centistokes at 25° C. with 10 parts of acetylene black in a mixer. Then 6 parts of vinyltriisopropenoxysilane and 0.5 part of tetramethylguanidylpropyltrimethoxysilane were added to the mixture, which was thoroughly mixed under vacuum. Further, 2.0 parts of a silane compound of the formula:

$(CH_3O)_3Si-C_3H_6-NH-C_2H_4-NH_2$ was added to the mixture, which was thoroughly mixed under vacuum.

Glass plates were furnished as the adherend. After the glass surface was wiped with toluene, Compositions 1 to 6 were applied thereto as a strip coating of 10 mm wide and 1 mm thick and cured for 3 days at 23° C. and RH 50%. The resulting sample was partially scribed with a cutter and the rubber coating was peeled in a perpendicular direction to determine the initial adhesion. Separately, the sample was exposed to saturated steam for 15 minutes, wiped to remove water, and allowed to stand for 10 minutes at 20° C. and RH 50%, whereupon the rubber coating was similarly peeled to determine the post steam exposure adhesion. The results are shown in Table 1.

TABLE 1

|  | Example | | | Comparative Example | | |
| --- | --- | --- | --- | --- | --- | --- |
|  | 1 Composition 1 | 2 Composition 2 | 3 Composition 3 | 1 Composition 4 | 2 Composition 5 | 3 Composition 6 |
| Initial adhesion | Bonded | Bonded | Bonded | Bonded | Bonded | Bonded |
| Post steam exposure adhesion | Bonded | Bonded | Bonded | Peeled | Peeled | Peeled |

The room temperature curable organopolysiloxane composition of the invention cures into silicone rubber which can maintain adherence even upon exposure to hot steam. The silicone rubber finds use as sealants used in wet areas and in the bonding and securing of electrical and electronic parts which are to be exposed to water vapor.

Japanese Patent Application No. 2000-312022 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of improving adherence of an architectural part or electrical or electronic part upon exposure to steam of a room temperature curable organopolysiloxane composition, said method comprising the step of:

blending (C) 0.1 to 10 parts by weight of an organosilicon compound of the following general formula (3):

$$(R^2O)_pSi-R^3-NH-R^4-NH_2 \atop R^1_{3-p} \qquad (3)$$

wherein $R^1$ is a substituted or unsubstituted monovalent hydrocarbon radical of 1 to 10 carbon atoms, $R^2$ is a substituted or unsubstituted monovalent hydrocarbon radical of 1 to 6 carbon atoms, $R^3$ is a divalent hydrocarbon radical of 1 to 10 carbon atoms, $R^4$ is a divalent aromatic ring-bearing hydrocarbon radical of 7 to 10 carbon atoms, and p is an integer of 1 to 3, at least one of the NH and $NH^2$ radicals being not directly attached to the aromatic ring in $R^4$, with (A) 100 parts by weight of an organopolysiloxane of the following general formula (2):

$$(R^2O)_{3-m}\overset{R^1_m}{\underset{|}{Si}}O(SiOR^1{}_2O)_n\overset{R^1_m}{\underset{|}{Si}}(OR^2)_{3-m} \qquad (2)$$

wherein $R^1$ and $R^2$ are as defined above, n is an integer of at least 10, and m is independently an integer of 0 or 1, or both, and (B) 0.1 to 30 parts by weight of a silane compound having at least two ketoxime radicals each attached to a silicon atom in a molecule, the remaining radicals attached to silicon atoms being selected from the group consisting of methyl, ethyl, propyl, vinyl and phenyl, or a partial hydrolyzate thereof or both.

2. The method of claim 1, wherein said architectural part or electrical or electronic part is composed of glass or coated steel.

3. The method of claim 1, wherein 1 to 5 parts by weight of component (C) is blended with components (A) and (B).

4. The method of claim 1, wherein in formula (3), $R^2$ is methyl or ethyl, and $R^3$ is methylene, ethylene, or propylene.

5. The method of claim 1, wherein in formula (3), $R^4$ is selected from the following structures:

$-CH_2-C_6H_4-$ (4), $-CH_2-C_6H_4-CH_2-$ (5), $-CH_2-C_6H_4-CH_2-CH_2-$ (6), $$-CH_2-C_6H_4-CH_2-CH_2-CH_2- \quad (7),$$

$$-CH_2-CH_2-C_6H_4- \quad (8),$$

$$-CH_2-CH_2-C_6H_4-CH_2- \quad (9),$$

$$-CH_2-CH_2-C_6H_4-CH_2-CH_2- \quad (10),$$

$$-CH_2-CH_2-CH_2-C_6H_4- \quad (11), \text{ and}$$

$$-CH_2-CH_2-CH_2-C_6H_4-CH_2- \quad (12).$$

6. The method of claim 1, wherein component (B) is a methyltributanoximesilane and component (C) is a compound of the formula $(CH_3O)_3Si-C_3H_6-NHCH_2-C_6H_4-CH_2NH_2$.

7. The method of claim 1, further comprising a filler.

8. The method of claim 7, wherein the filler is silica and/or carbon black.

9. The method of claim 1, wherein component (B) is selected from the group consisting of methyltris(dimethyl ketoxime)silane, methyltris(methyl ethyl keoxime)silane, ethyltris(methyl ethyl ketoxime)silane, methyltris(methyl isobutyl ketoxime)silane, vinyltris(methyl ethyl ketoxime)silane, and phenyltris(methyl ethyl ketoxime)silane.

10. The method of claim 1, wherein in component (B), the remaining radicals attached to silicon atoms are vinyl or phenyl.

\* \* \* \* \*